(12) United States Patent
Seo et al.

(10) Patent No.: US 12,554,555 B2
(45) Date of Patent: Feb. 17, 2026

(54) METHOD AND APPARATUS FOR CONFIGURING CLUSTER FOR MACHINE LEARNING SERVICE BASED ON MINIMIZING POWER CONSUMPTION OF GPU SERVERS

(71) Applicant: ELECTRONICS AND TELECOMMUNICATIONS RESEARCH INSTITUTE, Daejeon (KR)

(72) Inventors: Eui Seong Seo, Daejeon (KR); Jong Seok Kim, Daejeon (KR); Jun Yeol Yu, Daejeon (KR); Sung In Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 483 days.

(21) Appl. No.: 18/182,148

(22) Filed: Mar. 10, 2023

(65) Prior Publication Data

US 2023/0297442 A1 Sep. 21, 2023

(30) Foreign Application Priority Data

Mar. 17, 2022 (KR) ........................ 10-2022-0033494

(51) Int. Cl.
  *G06F 9/46* (2006.01)
  *G06F 9/50* (2006.01)

(52) U.S. Cl.
  CPC .......... *G06F 9/5094* (2013.01); *G06F 9/5011* (2013.01); *G06F 2209/505* (2013.01)

(58) Field of Classification Search
  None
  See application file for complete search history.

(56) References Cited

U.S. PATENT DOCUMENTS 10,025,364 B2 7/2018 Kim
10,509,429 B2 12/2019 Lee et al.
(Continued)

FOREIGN PATENT DOCUMENTS

JP  2015509622 A   3/2015
KR  101602950 B1   3/2016
(Continued)

OTHER PUBLICATIONS

Chaudhary et al; Balancing Efficiency and Fairness in Heterogeneous GPU clusters for Deep Learning; EuroSys'20, Apr. 2020 (Year: 2020).*

(Continued)

*Primary Examiner* — Bing Zhao
(74) *Attorney, Agent, or Firm* — Rabin & Berdo, P.C.

(57) ABSTRACT

Provided is a method of configuring a cluster, which is a method of assigning graphics processing unit (GPU) servers in a cloud in which a plurality of machine learning (ML) services are executed using an apparatus for configuring a cluster. The apparatus for configuring a cluster is configured to measure the power consumption characteristics of each of the GPU servers constituting the cloud for each of a plurality of different models processing the plurality of ML services and assign at least one GPU server to each of the plurality of models using power consumption characteristics of each of the GPU servers for each of the plurality of models to configure a GPU cluster for each of the plurality of models.

3 Claims, 8 Drawing Sheets

(56) References Cited

U.S. PATENT DOCUMENTS

| | | | |
|---|---|---|---|
| 10,747,286 B2 * | 8/2020 | Kaburlasos | G06F 1/3206 |
| 10,983,835 B2 | 4/2021 | Kim et al. | |
| 2014/0052965 A1 | 2/2014 | Sarel | |
| 2021/0049042 A1 | 2/2021 | Suh | |

FOREIGN PATENT DOCUMENTS

| | | |
|---|---|---|
| KR | 102129389 B1 | 7/2020 |
| KR | 20210020570 A | 2/2021 |

OTHER PUBLICATIONS

Yu Jun Yeol, "A resource-management scheme for energy-efficient ML inference services in a heterogeneous GPU cloud", Department of Electrical and Computer Engineering, Sungkyunkwan University (Feb. 28, 2022).

* cited by examiner

METHOD AND APPARATUS FOR CONFIGURING CLUSTER FOR MACHINE LEARNING SERVICE BASED ON MINIMIZING POWER CONSUMPTION OF GPU SERVERS

CROSS-REFERENCE TO RELATED APPLICATIONS

This application claims priority to Korean Patent Application No. 10-2022-0033494 filed on Mar. 17, 2022 in the Korean Intellectual Property Office (KIPO), the entire contents of which are hereby incorporated by reference.

BACKGROUND

1. Technical Field

Example embodiments of the present invention relate in general to a method and apparatus for configuring a cluster for a machine learning service, and more specifically, to a method and apparatus for configuring a cluster for a machine learning service that are capable of maximizing energy efficiency of the entire cloud.

2. Related Art

As a cloud gradually expands its facilities, it runs various generations of graphics processing units (GPUs).

A cloud artificial intelligence (AI) service executes inference tasks for various types of machine learning (ML) models, and the energy required for ML model inference greatly varies depending on the combination of a GPU and a model.

In general, newer GPUs are more energy efficient, but all tasks are not executed using newer GPUs, so there is a need for an algorithm that assigns tasks to GPUs.

However, the energy efficiency superiority of the newest GPU greatly varies depending on ML models to be executed. For example, a neural network A when inferred by an old GPU may have an energy consumption of 150 and, when inferred by a newer GPU, may have an improved energy consumption of 100, but a neural network B when inferred by an old GPU may have an energy consumption of 160 and, when inferred by a newer GPU, may have an energy consumption of 140. In other words, since the energy consumption of a GPU is determined by the degree to which the computing requirements and features of an ML model match the combination of hardware of a GPU, the degree of improvement in the energy consumption of a GPU may vary between ML models.

In the existing clouds, GPU resource allocation, such as allocating high-performance GPUs first or prioritizing low-cost GPUs based on GPU performance, has been proposed, but energy efficiency is not considered.

SUMMARY

Accordingly, example embodiments of the present invention are provided to substantially obviate one or more problems due to limitations and disadvantages of the related art.

Example embodiments of the present invention provide a method and apparatus for configuring a cluster for a machine learning (ML) service capable of maximizing the energy efficiency of the entire cloud.

In some example embodiments, a method of configuring a cluster, which is a method of assigning graphics processing unit (GPU) servers in a cloud in which a plurality of ML services are executed using an apparatus for configuring a cluster, includes: measuring power consumption characteristics of each of the GPU servers constituting the cloud for each of a plurality of different models processing the plurality of ML services; and configuring a GPU cluster for each of the plurality of models by assigning at least one GPU server to each of the plurality of models using the power consumption characteristics of each of the GPU servers for each of the plurality of models The configuring of the GPU cluster may include assigning at least one GPU server to each of the plurality of models such that a sum of power consumption amounts of all GPU servers constituting the cloud may be minimized using the power consumption characteristics of each of the GPU servers for each of the plurality of models.

The power consumption characteristics of each of the GPU servers may include a maximum throughput of each of the GPU servers and a power consumption according to the maximum throughput.

The assigning of the at least one GPU server to each of the plurality of models may include calculating the number of GPU servers that further satisfy first to third conditions for each of the plurality of models, wherein the first condition may be that a sum of maximum throughputs of all GPU servers assigned to a GPU cluster of a model is greater than a maximum request amount input to the model, the second condition may be that a sum of GPU servers of all GPU clusters may not exceed the number of GPU servers constituting the cloud, and the third condition may be that the number of the GPU servers assigned to the GPU cluster of the model may not exceed the total number of GPU servers constituting the cloud.

In other example embodiments, an apparatus for configuring a cluster for a ML service, which is an apparatus for assigning GPU servers in a cloud in which a plurality of ML services are executed, includes: an energy consumption characteristic table generator configured to measure power consumption characteristics of each of the GPU servers constituting the cloud for each of a plurality of different models processing the plurality of ML services; and a GPU assigner configured to assign at least one GPU server to each of the plurality of models using the power consumption characteristics of each of the GPU servers for each of the plurality of models to configure a GPU cluster for each of the plurality of models.

The GPU assigner may assign at least one GPU server to each of the plurality of models such that a sum of power consumption amounts of all GPU servers constituting the cloud is minimized.

The power consumption characteristics of each of the GPU servers may include a maximum throughput of each of the GPU servers and a power consumption according to the maximum throughput.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1A:
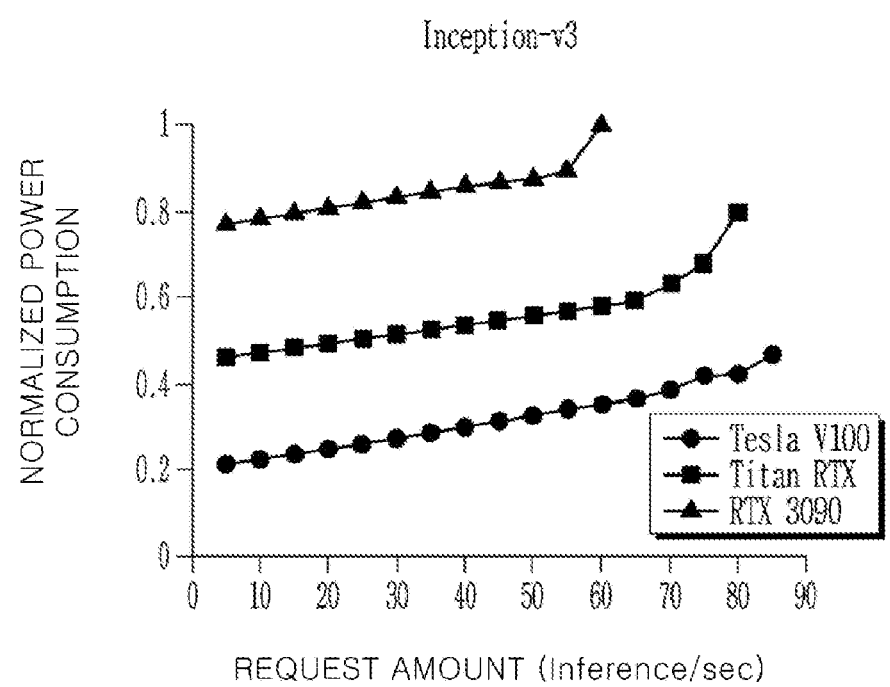
FIGS. 1A and 1B are graphs showing the power consumption of graphics processing units (GPUs) according to ML inference models.

Hereinafter, embodiments of the present disclosure will be described in detail with reference to the accompanying drawings so that those of ordinary skill in the art may easily implement the embodiments. However, the present disclosure may be implemented in various different forms and is not limited to the embodiments described herein. In addition, in the drawings, parts irrelevant to the description are omitted in order to clearly describe the present disclosure, and like reference numerals are attached to like parts throughout the specification.

In the description, when a part "includes" a certain component, it means that other components may be further included rather than excluding other components unless specifically stated to the contrary.

Hereinafter, a method and apparatus for configuring a cluster for a machine learning service according to embodiments of the present disclosure will be described in detail with reference to drawings.

Figure 1B:
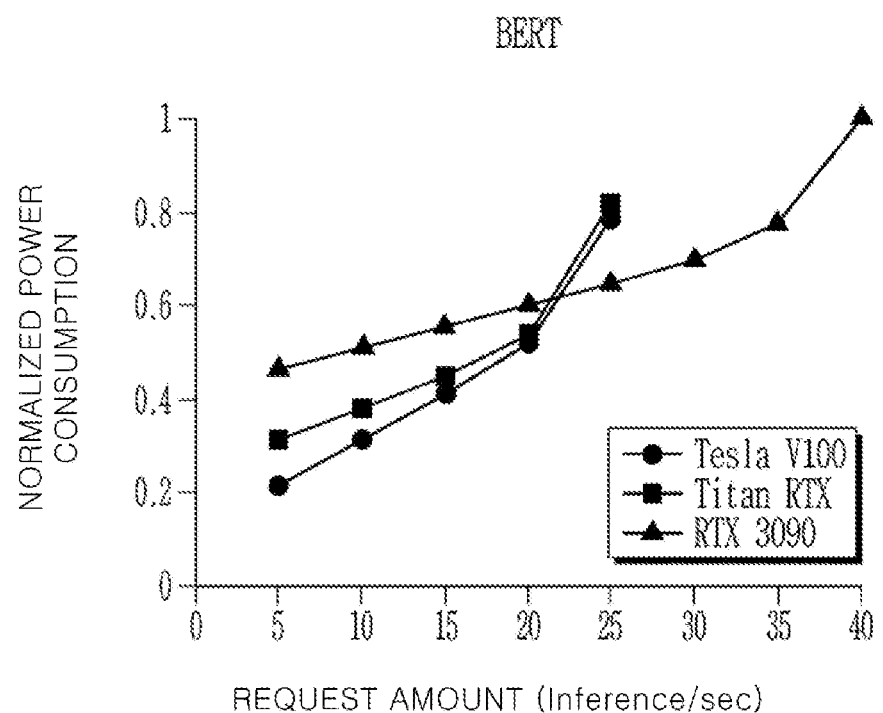

FIGS. 1A and 1B are graphs showing the power consumption of GPUs according to ML inference models.

FIG. 1A shows power consumption when an inference request is processed using an image classification model (Inception-v3) on three types of graphics processing units (GPUs) (RTX3090, TitanRTX, and Tesla V100) having different architectures and performance specifications, and FIG. 1B shows power consumption when an inference request is processed using a language processing model (bidirectional encoder representations from transformers, BERT) on the three types of GPUs (RTX3090, TitanRTX, and Tesla V100).

Referring to FIG. 1A, the maximum throughput increases in the order of RTX3090, TitanRTX, and Tesla V100, and more power is consumed in response to the same number of inference requests being input per second.

In addition, referring to FIG. 1B, the RTX3090 can process 1.6 times more inference requests. In addition, although the RTX3090 consumes a large amount of power at a low rate of inference requests per second, power consumption reverses as the inference requests increase.

As described above, for the two different models, the three types of GPUs (Tesla V100, Titan RTX, and RTX3090) processing inference requests show different amounts of power consumption according to the number of inference requests per second. In addition, the three types of GPUs also have different power consumption patterns depending on the architecture of the GPU as well as the type of the inference request being processed.

Therefore, the present disclosure provides a method and apparatus for configuring a cluster that are capable of maximizing the energy efficiency of the entire cloud by considering the energy consumption according to the combination of various types of machine learning inference workloads and GPUs running in the cloud.

Figure 2:
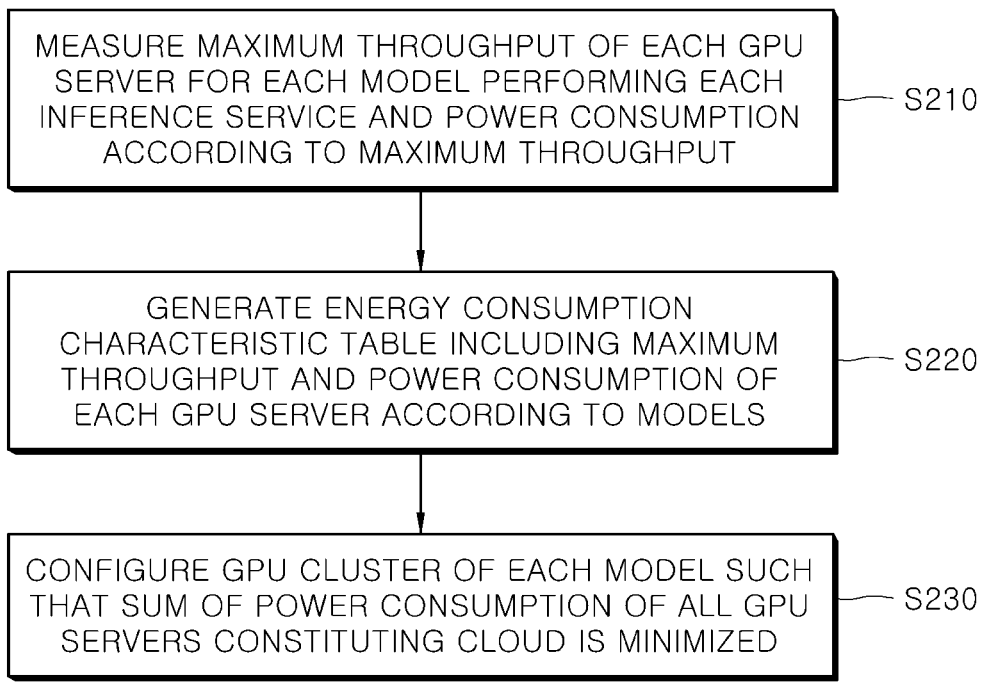
FIG. 2 is a diagram illustrating a method of configuring a cluster according to an embodiment.

FIG. 2 is a diagram illustrating a method of configuring a cluster according to an embodiment.

Referring to FIG. 2, in order to allocate a plurality of heterogeneous GPU servers to an inference service in a cloud, the power consumption of the GPU servers needs to be known in advance. Therefore, the apparatus for configuring a cluster for ML inference (hereinafter referred to as "an apparatus for configuring a cluster") analyzes the energy consumption characteristics of each of the GPU servers for each inference service before configuring a GPU cluster for each inference service.

Specifically, the apparatus for configuring a cluster measures the maximum throughput of each of the GPU servers and the power consumption according to the maximum throughput for models each performing a different inference service (S210), and generates an energy consumption characteristic table including the maximum throughput and the power consumption of each of the GPU servers according to the models (S220). In this case, at least one GPU may be installed in one GPU server.

As illustrated in FIGS. 1A and 1B, power consumption varies according to the combination of the type of model and the GPU. Therefore, in order to reduce energy consumption in the entire cloud, there is a need to determine a method of dividing a GPU resource pool and configuring a GPU cluster through energy comparison between GPUs for each model.

The apparatus for configuring a cluster configures an energy-efficient GPU cluster for each model using a generalized assignment problem (GAP). When a GPU server is an item of the GAP, each model is a bin of the GAP, and the power consumption when each GPU server performs processing at the maximum throughput for each model is replaced with the cost of the GAP, a GAP assigning items (GPU servers) to a bin (a model) such that the total cost (the total amount of power consumption) is minimized may be generated.

In general, the sum of inference request throughputs of GPU servers need to be greater than the amount of inference requests input to a model so that the inference requests can be processed in a timely manner. This may be expressed as a GAP-minimum quantity (MQ) problem that further includes a criterion for a minimum of the total size of items contained in each bin in a GAP. GAP-MQ is known as nondeterministic polynomial time (NP)-complete, and in this problem, since the unit of an item (a GPU server) is an integer, the solution may be found through linear integer programming.

That is, the apparatus for configuring a cluster configures an energy-efficient GPU cluster for each model by assigning GPU servers to each model such that the sum of power consumption amounts of all GPU servers constituting a cloud is minimized through Expressions 1 to 4 (S230).

$$\text{minimize} \sum_{i=1}^{M} \sum_{j=1}^{N} p_{ij} x_{ij} \qquad \text{[Expression 1]}$$

$$\text{subject to } q_i \leq \sum_{j=1}^{N} r_{ij} x_{ij} \qquad \text{[Expression 2]}$$

$$\sum_{i=1}^{M} x_{ij} \leq x_j^{max} \qquad \text{[Expression 3]}$$

$$0 \leq x_{ij} \leq x_j^{max} \qquad \text{[Expression 4]}$$

In Expressions 1 to 4, $r_{ij}$ represents the maximum throughput when a GPU server j processes a service using a model i, and $P_{ij}$ represents the power consumption when the GPU server j processes as many inference requests as $r_{ij}$ using the model i. In this case, $P_{ij}$ represents the total power of a single server as well as GPUs installed in the GPU server j. Both $P_{ij}$ and $r_{ij}$ are values obtained by directly performing inference requests on all combinations of a plurality of models processed in a cloud and GPU servers and performing profiling. $x_{ij}$ represents the number of GPU servers j assigned to a cluster of the model i.

Expressions 1 to 4 represent conditions of integer programming for energy-efficient GPU resource allocation at the cloud level, and Expression 1 represents a goal of minimizing the sum of power consumption amounts of GPU servers assigned to clusters of all models. That is, the GPU cluster for each model is configured such that the entire cloud has the highest energy efficiency.

In this case, in order to find the number of GPU servers for each model that satisfies the optimization condition shown in Expression 1, conditions of Expressions 2 to 4 are required.

Expression 2 represents a condition that the sum of the maximum throughputs $r_{ij}$ of all GPU servers assigned to a cluster should be greater than the maximum request quantity $q_i$ input to a model i.

Expression 3 represents a condition that the sum of GPU servers j assigned to all cluster configurations should not exceed the number $$x_j^{max}$$

of all GPU servers constituting the cloud.

Expression 4 represents a range of values of $x_{ij}$ that represents the number j of GPU servers assigned to a cluster of a model i.

Figure 3:
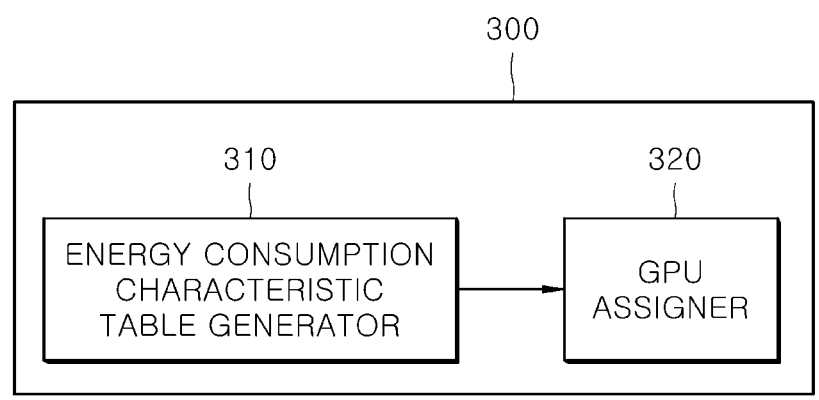
FIG. 3 is a diagram illustrating an apparatus for configuring a cluster according to an embodiment.

FIG. 3 is a diagram illustrating an apparatus for configuring a cluster according to an embodiment.

Referring to FIG. 3, the apparatus for configuring a cluster 300 includes an energy consumption characteristic table generator 310 and a GPU assigner 320.

The energy consumption characteristic table generator 310 measures the maximum throughput of each GPU server constituting a cloud for each of a plurality of different models processing a plurality of inference services that are executed in the cloud and the power consumption according to the maximum throughput, and generates and manages an energy consumption characteristic table including the maximum throughput and the power consumption of each GPU server according to models.

The GPU assigner 320 configures a GPU cluster for each model such that the sum of power consumption amounts of all GPU servers constituting the cloud is minimized based on Expressions 1 to 4 using the maximum throughput and the power consumption of each GPU server according to models in the energy consumption characteristic table.

Figure 4:
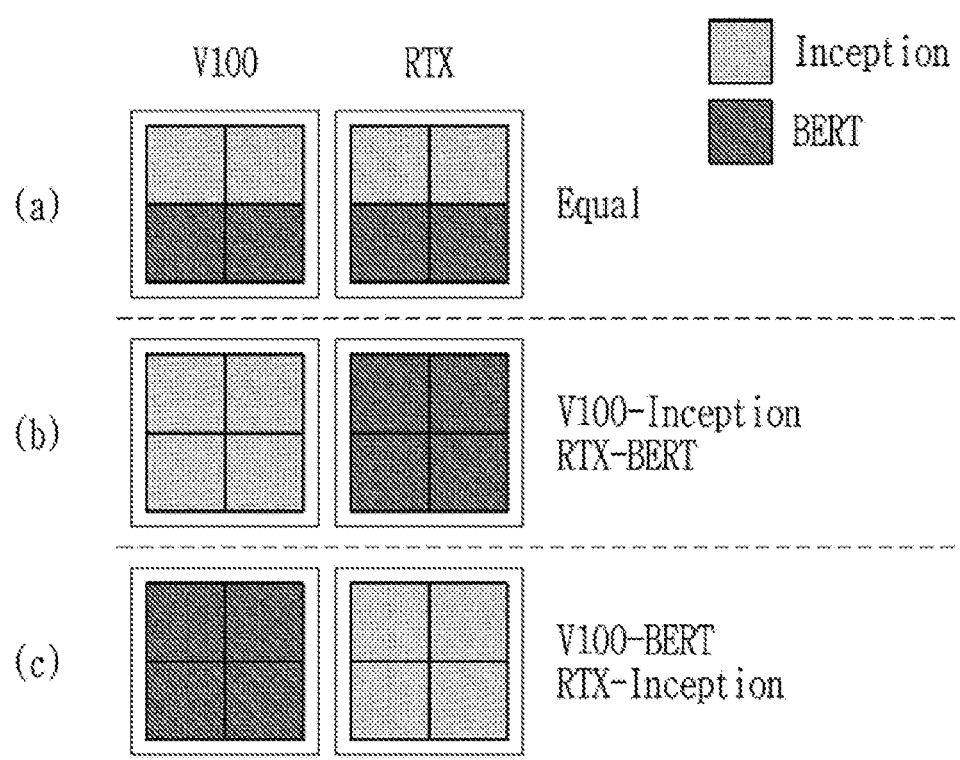
FIG. 4 is a diagram illustrating an experimental environment.
Figure 5:
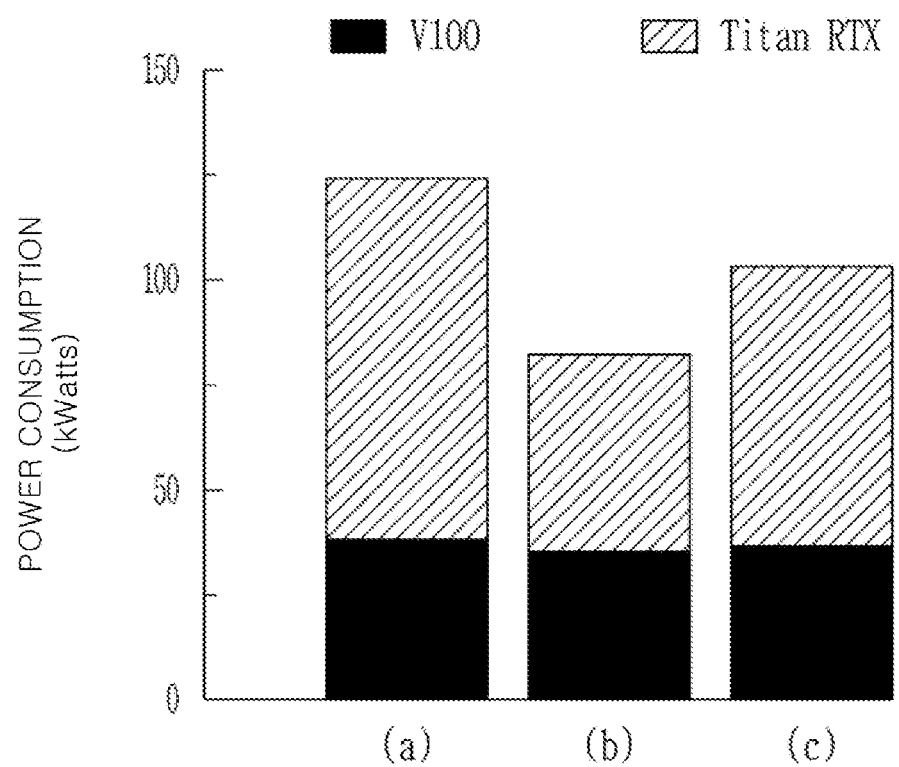
FIG. 5 is a graph showing the power consumption according to a combination of a GPU and a model in the experimental environment shown in FIG. 4.

FIG. 4 is a diagram illustrating an experimental environment, and FIG. 5 is a graph showing the power consumption according to a combination of a GPU and a model in the experimental environment shown in FIG. 4.

As shown in FIG. 4, there are two clusters each composed of 100 servers each equipped with the same four GPUs, and the two clusters use Tesla V100 GPUs and TitanRTX GPUs, respectively, and Inception-v3 and BERT are used as models to be processed.

In this case, the power consumption of the GPUs in the cluster was measured in each case of FIGS. 4A, 4B, and 4C. The power consumption of each of the clusters may be calculated based on data measured by GPUs in each of the clusters. The case shown in FIG. 4A represents a case where inference requests of both models are equally processed in both clusters. That is, this is a case where each of the two clusters processes half of the inference requests of each model. The cases shown in FIGS. 4B and 4C represent a case where one cluster exclusively processes one model. The case shown in FIG. 4B is a case where a cluster composed of Tesla V100 GPUs processes Inception-v3 and a cluster composed of TitanRTX GPUs processes BERT, and the case shown in FIG. 4C is a case where a cluster composed of Tesla V100 GPUs processes BERT, and a cluster composed of TitanRTX GPUs processes Inception-v3.

As a result, referring to FIG. 5, it can be seen that a smaller amount of power is consumed when one cluster exclusively processes one model compared to when two clusters equally process both models.

As described above, since there is a difference in power consumption depending on the combination of models and GPUs, an energy-efficient GPU cluster for each model may be configured through the optimization problems of Expressions 1 to 4, thereby greatly reducing the amount of energy consumed for ML inference tasks in a cloud service in which various GPUs operate.

Figure 6:
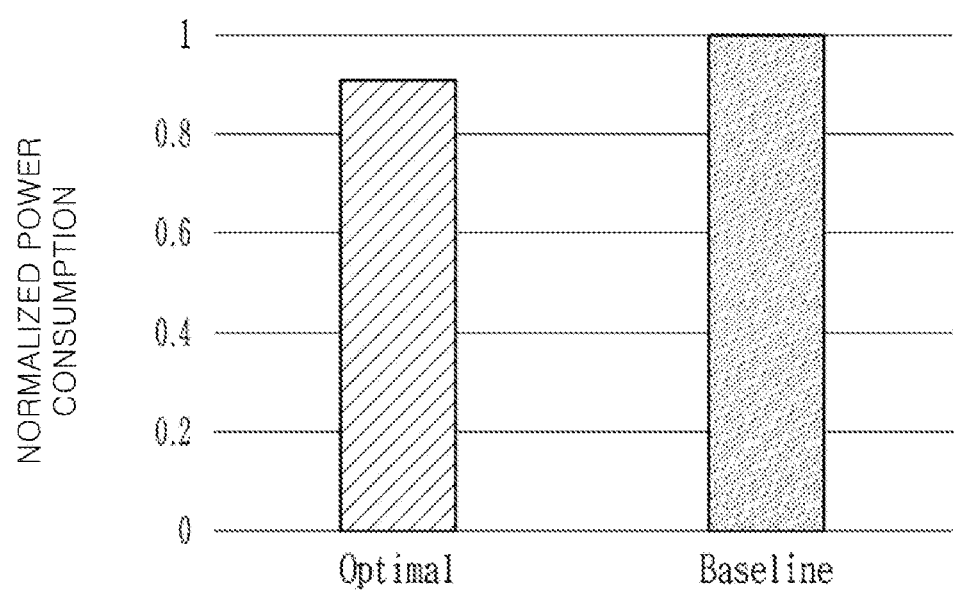
FIG. 6 is a diagram showing simulation results of power consumption of a GPU cluster based on a method of configuring a cluster according to an embodiment.

FIG. 6 is a diagram showing a simulation result of power consumption of a GPU cluster based on a method of configuring a cluster according to an embodiment, which shows a result of simulation in a small-scale cloud environment composed of three different types of GPU servers processing a total of five inference services.

Referring to FIG. 6, it can be seen that a method of configuring a GPU cluster calculated through the integer programming method according to the embodiment of the present invention has an energy consumption that is about 8.9% smaller than that of a method (Baseline) of configuring a GPU cluster based on the hardware performance of the GPU.

Figure 7:
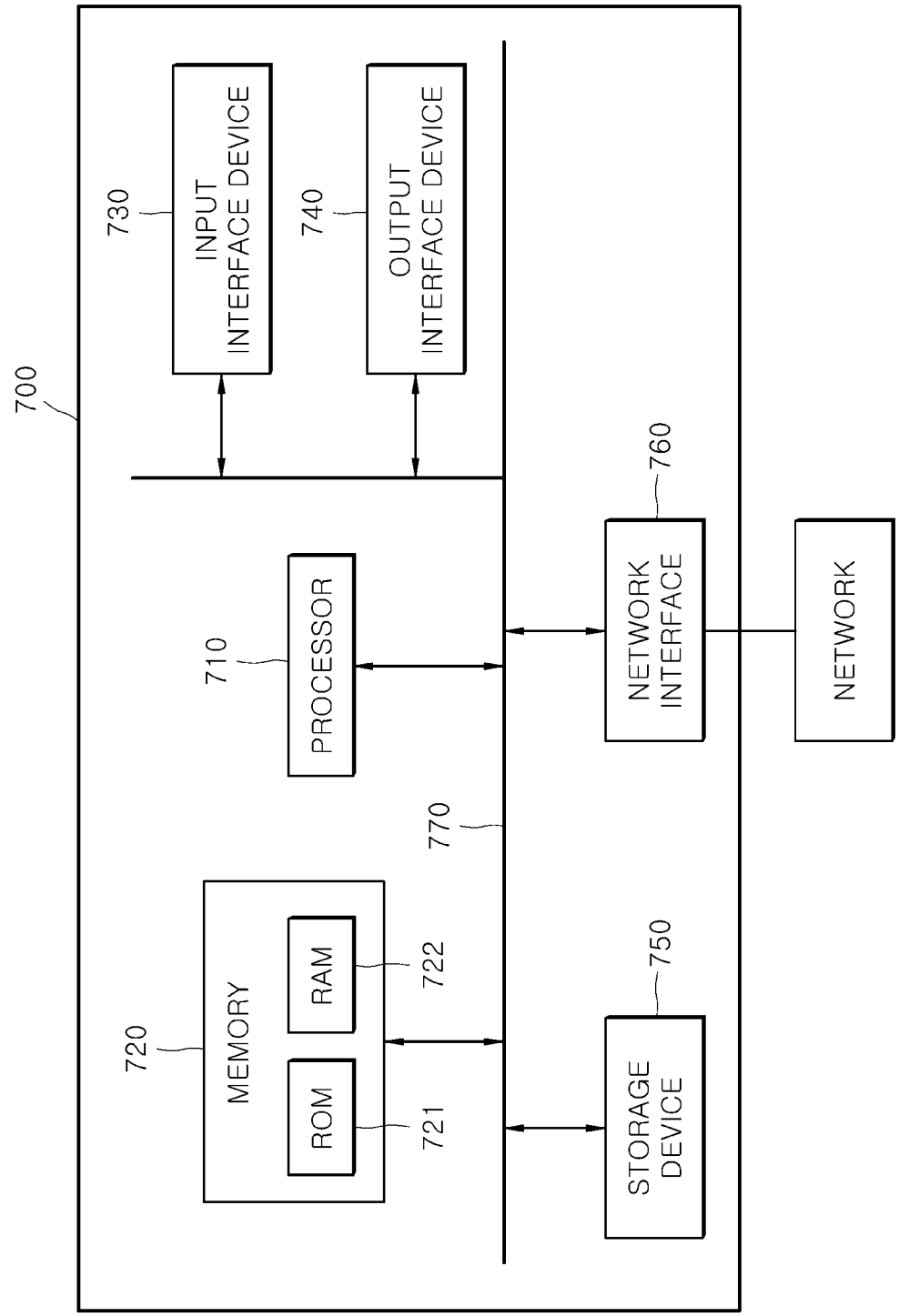
FIG. 7 is a diagram illustrating an apparatus for configuring a cluster according to another embodiment.

FIG. 7 is a diagram illustrating an apparatus for configuring a cluster according to another embodiment.

Referring to FIG. 7, an apparatus 700 for configuring a cluster may represent a computing device in which the above described method of configuring a cluster is implemented.

The apparatus 700 for configuring a cluster may include at least one of a processor 710, a memory 720, an input interface device 730, an output interface device 740, a storage device 750, and a network interface device 760. Each of the components may be connected by a bus 770 to communicate with each other. In addition, each of the components may be connected through an individual interface or an individual bus centered on the processor 710, rather than the common bus 770.

The processor 710 may be implemented in various types, such as an application processor (AP), a central processing unit (CPU), a GPU, and the like, and may be a semiconductor device for executing instructions stored in the memory 720 or the storage device 750. The processor 710 may execute program instructions stored in at least one of the memory 720 or the storage device 750. Such a processor 710 may be configured to implement the functions and methods described above based on FIGS. 1 to 6. For example, the processor 710 may store program instructions for implementing at least some of the functions of the energy consumption characteristic table generator 310 and the GPU assigner 320 described above with reference to FIG. 3 in the memory 720, and perform control such that the operations described with reference to FIGS. 2 and 3 are performed.

The memory 720 and the storage device 750 may include various types of volatile or non-volatile storage media. For example, the memory 720 may include a read-only memory (ROM) 721 and a random access memory (RAM) 722. The memory 720 may be located inside or outside the processor 710, and the memory 720 may be connected to the processor 710 through various known methods.

The input interface device 730 is configured to provide data to the processor 710.

The output interface device 740 is configured to output data from the processor 710.

The network interface device 760 may transmit or receive signals to or from another device through a wired network or a wireless network.

At least a part of the method of configuring a cluster according to the embodiment of the present disclosure may be implemented as a program or software executed on the computing device, and the program or software may be stored in a computer-readable medium.

In addition, at least a part of the method of configuring a cluster according to the embodiment of the present disclosure may be implemented as hardware that may be electrically connected to the computing device.

As is apparent from the above, according to embodiments, the amount of energy consumed for a machine learning (ML) inference task in a cloud service that operates various GPUs can be reduced.

Although embodiments of the present disclosure have been described in detail above, the scope of the present disclosure is not limited thereto, and various modifications and improved forms of the present disclosure provided by those skilled in the art using the basic concept of the present disclosure as defined in the following claims can also fall within the scope of the present disclosure.

What is claimed is:

1. An apparatus for configuring a cluster for a machine learning (ML) service, which is an apparatus for assigning graphics processing unit (GPU) servers in a cloud in which a plurality of ML services are executed, the apparatus comprising:
   one or more memories; and
   one or more processors, coupled to the one or more memories, configured to:
   determining power consumption characteristics of each of the GPU servers in the cloud for each of a plurality of different models processing the plurality of ML services, by measuring, through profiling, a maximum throughput of each GPU server for each model and a power consumption according to the maximum throughput, and storing measured maximum throughputs and power consumptions in an energy consumption characteristic table;
   calculating, for each model, a number of GPU servers to be assigned to a GPU cluster of the model by solving an integer programming problem that minimizes a sum of power consumption amounts of all GPU servers constituting the cloud, subject to first to third conditions, wherein:
   the first condition is that a sum of maximum throughputs of all GPU servers assigned to a GPU cluster of the model is greater than a maximum request amount input to the model, the second condition is that a sum of GPU servers of all GPU clusters does not exceed a number of GPU servers constituting the cloud, and the third condition is that the number of the GPU servers assigned to the GPU cluster of the model does not exceed a total number of GPU servers constituting the cloud; and
   configuring a GPU cluster for each of the plurality of models by assigning GPU servers to each model according to the calculated numbers of GPU servers.

2. A method of configuring a cluster, which is a method of assigning graphics processing unit (GPU) servers in a cloud in which a plurality of machine learning (ML) services are executed using an apparatus for configuring a cluster, the method comprising:
   measuring power consumption characteristics of each of the GPU servers in the cloud for each of a plurality of different models processing the plurality of ML services by measuring, through profiling, a maximum throughput of each GPU server for each model and a power consumption according to the maximum throughput, and storing the measured maximum throughputs and power consumptions in an energy consumption characteristic table;
   calculating, for each model, a number of GPU servers to be assigned to a GPU cluster of the model by solving an integer programming problem that minimizes a sum of power consumption amounts of all GPU servers constituting the cloud, subject to first to third conditions, wherein:
   the first condition is that a sum of maximum throughputs of all GPU servers assigned to a GPU cluster of the model is greater than a maximum request amount input to the model, the second condition is that a sum of GPU servers of all GPU clusters does not exceed a number of GPU servers constituting the cloud, and the third condition is that the number of the GPU servers assigned to the GPU cluster of the model does not exceed a total number of GPU servers constituting the cloud; and
   configuring a GPU cluster for each of the plurality of models by assigning GPU servers to each model according to the calculated numbers of GPU servers.

3. An apparatus for configuring a cluster for a machine learning (ML) service, which is an apparatus for assigning graphics processing unit (GPU) servers in a cloud in which a plurality of ML services are executed, the apparatus comprising:
   an energy consumption characteristic table generator configured to measure power consumption characteristics of each of the GPU servers in the cloud for each of a plurality of different models processing the plurality of ML services by measuring, through profiling, a maximum throughput of each GPU server for each model and a power consumption according to the maximum throughput, and storing the measured maximum throughputs and power consumptions in an energy consumption characteristic table; and
   a GPU assigner configured to calculate, for each model, a number of GPU servers to be assigned to a GPU cluster of the model by solving an integer programming problem that minimizes a sum of power consumption amounts of all GPU servers constituting the cloud, subject to first to third conditions, wherein: the first condition is that a sum of maximum throughputs of all GPU servers assigned to a GPU cluster of the model is greater than a maximum request amount input to the model, the second condition is that a sum of GPU servers of all GPU clusters does not exceed a number of GPU servers constituting the cloud, and the third condition is that the number of the GPU servers assigned to the GPU cluster of the model does not exceed a total number of GPU servers constituting the cloud, and assign GPU servers to each model according to the calculated numbers of GPU servers for configuring a GPU cluster for each of the plurality of models.

* * * * *